United States Patent
Douglas (10) Patent No.: US 9,714,617 B2
(45) Date of Patent: Jul. 25, 2017

(54) SYSTEM AND METHOD FOR LIMITING A VOLUMETRIC EFFICIENCY OF AN ENGINE DURING ENGINE CRANKING TO REDUCE EMISSION

(71) Applicant: GM GLOBAL TECHNOLOGY OPERATIONS LLC, Detroit, MI (US)

(72) Inventor: Scot A. Douglas, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 769 days.

(21) Appl. No.: 13/775,673

(22) Filed: Feb. 25, 2013

(65) Prior Publication Data

US 2014/0238344 A1    Aug. 28, 2014

(51) Int. Cl.
   F02D 41/00   (2006.01)
   F02D 41/06   (2006.01)
   F02N 11/08   (2006.01)

(52) U.S. Cl.
   CPC ....... F02D 41/0002 (2013.01); F02D 41/062 (2013.01); *F02D 2041/001* (2013.01); *F02N 11/0848* (2013.01); *Y02T 10/42* (2013.01)

(58) Field of Classification Search
   CPC .......... F02D 2041/001; F02D 41/0002; F02D 41/062; F02N 11/0848; Y02T 10/42
   USPC ..... 123/337, 406.54, 406.55, 685, 453, 366, 123/90.15, 90.16, 321, 179.16
   See application file for complete search history.

(56) References Cited

U.S. PATENT DOCUMENTS

| | | | | |
|---|---|---|---|---|
| 3,603,297 A | * | 9/1971 | Sherwin | F02M 3/062 123/328 |
| 4,237,830 A | * | 12/1980 | Stivender | F02D 41/0205 123/399 |
| 4,892,076 A | * | 1/1990 | Toshimits | F02D 31/002 123/336 |
| 4,894,781 A | * | 1/1990 | Sato | F02D 41/266 701/102 |
| 4,938,195 A | * | 7/1990 | Miyazaki | F02D 41/021 123/488 |
| 6,062,189 A | * | 5/2000 | Kaneko | F02B 17/005 123/295 |
| 6,269,294 B1 | * | 7/2001 | Saito | B60W 10/06 477/906 |
| 6,966,299 B2 | * | 11/2005 | Miyamoto | F02D 37/02 123/339.11 |
| 8,353,266 B2 | * | 1/2013 | White | F02D 41/062 123/179.16 |
| 2004/0221834 A1 | | 11/2004 | Miyamoto et al. | |
| 2008/0283005 A1 | * | 11/2008 | Kawada | F02N 11/006 123/90.15 |
| 2010/0318278 A1 | * | 12/2010 | Douglas | F02D 41/0002 701/103 |
| 2012/0138005 A1 | * | 6/2012 | White | F02D 41/062 123/179.3 |

(Continued)

*Primary Examiner* — John Kwon
*Assistant Examiner* — Johnny H Hoang (57) ABSTRACT

A system according to the principles of the present disclosure includes an engine cranking module and a throttle control module. The engine cranking module determines whether an engine is cranking based on at least one of an input received from an ignition system and engine speed, and generates a signal indicating whether the engine is cranking. The throttle control module selectively adjusts a throttle of the engine to a fully closed position when the signal indicates that the engine is cranking.

20 Claims, 4 Drawing Sheets

(56) References Cited

U.S. PATENT DOCUMENTS

2014/0238344 A1* 8/2014 Douglas ........................ 123/337

* cited by examiner

FIG. 4 ic efficiency of an engine during engine cranking according to the principles of the present disclosure.
SYSTEM AND METHOD FOR LIMITING A VOLUMETRIC EFFICIENCY OF AN ENGINE DURING ENGINE CRANKING TO REDUCE EMISSION

FIELD

The present disclosure relates to internal combustion engines, and more specifically, to systems and methods for limiting a volumetric efficiency of an engine during engine cranking to reduce emissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes an engine cranking module and a throttle control module. The engine cranking module determines whether an engine is cranking based on at least one of an input received from an ignition system and engine speed, and generates a signal indicating whether the engine is cranking. The throttle control module selectively adjusts a throttle of the engine to a fully closed position when the signal indicates that the engine is cranking.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An exhaust system typically includes a catalytic converter that reduces emissions produced by an engine. A catalytic converter reduces emissions most effectively when the catalytic converter reaches an operating temperature. When an engine is started after the engine is off for a period, referred to as a cold start, the temperature of the catalytic converter is typically less than the operating temperature. Thus, the catalytic converter may not reach the operating temperature until the engine operates for a period. The majority of emissions that pass through the exhaust system and into the environment may pass through the exhaust system during this period.

A system and method according to the principles of the present disclosure limits a volumetric efficiency of an engine when the engine is cranking to decrease the amount of air that is drawn into each cylinder of the engine. Volumetric efficiency is a ratio (or percentage) of the actual quantity of air that enters a cylinder during induction to the potential (or geometric) capacity of the cylinder under static conditions. The system and method may limit the volumetric efficiency of the engine by fully closing a throttle and/or limiting an opening duration of one or more intake valves.

Decreasing the amount of air that is drawn into each cylinder of the engine decreases the amount of fuel that must be provided to each cylinder in order to achieve a stoichiometric ratio. Decreasing the amount of fuel provided to each cylinder decreases the amount of emissions produced by the engine. Decreasing the amount of emissions output the engine decreases the amount of emissions that pass through an exhaust system of the engine and into the environment, particularly when the amount of engine-out emissions during a cold start is decreased.

Figure 1:
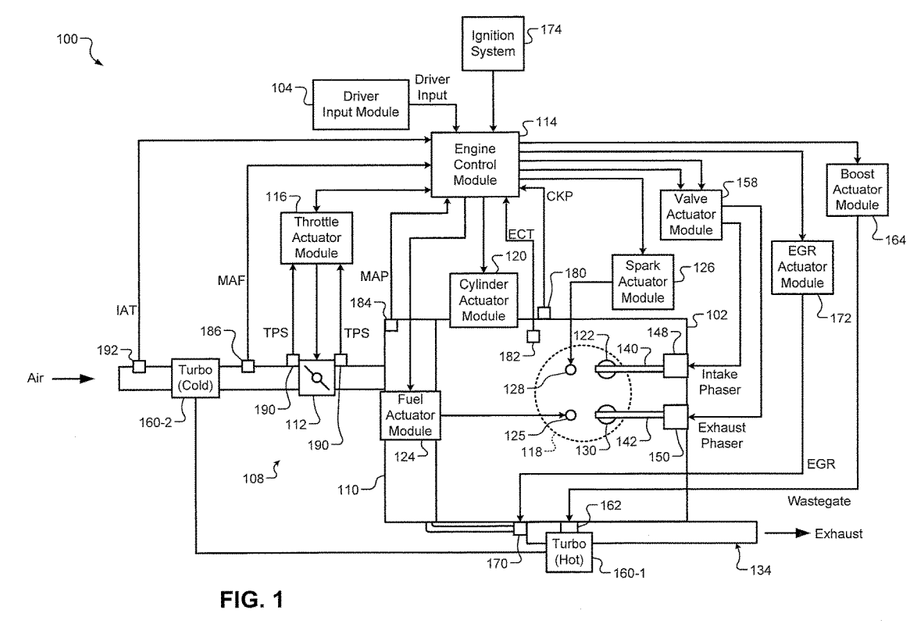
FIG. 1 is a functional block diagram of an engine system according to the principles of the present disclosure.

Referring to FIG. 1, an example implementation of an engine system 100 includes an engine 102 that combusts an air/fuel mixture to produce drive torque for a vehicle based on a driver input from a driver input module 104. The driver input may be based on a position of an accelerator pedal. The driver input may also be based on cruise control, which may be an adaptive cruise control system that varies vehicle speed to maintain a predetermined following distance.

Air is drawn into the engine 102 through an intake system 108. The intake system 108 includes an intake manifold 110 and a throttle 112. For example only, the throttle 112 may include a butterfly valve having a rotatable blade. An engine control module (ECM) 114 controls a throttle actuator module 116, which regulates opening of the throttle 112 to control the amount of air drawn into the intake manifold 110. The throttle actuator module 116 may actuate the throttle 112 between a fully open position (e.g., a position in which the throttle 112 is 100 percent open) and a fully closed position (e.g., a position in which the throttle 112 is 0 percent open).

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates a fuel injector 125 to achieve a desired air/fuel ratio. Fuel may be injected into the intake manifold 110 at a central location or at multiple locations, such as near the intake valve 122 of each of the cylinders. The fuel injector 125 may inject fuel directly into the cylinder 118 (as shown) or into a mixing chamber associated with the cylinder 118. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic and/or hydraulic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake cam phaser 148 and the exhaust cam phaser 150 based on signals from the ECM 114. When implemented, variable valve lift and/or other valve actuators may also be controlled by the valve actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle 112. In various implementations, a supercharger (not shown), driven by the crankshaft, may compress air from the throttle 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The ECM 114 may start the engine 102 and/or stop the engine 102 based on input received from an ignition system 174. The ignition system 174 may include a key or a button. The ECM 114 may start the engine 102 when a driver turns the key from an off position to an on (or run) position or when the driver presses the button. The ECM 114 may stop the engine 102 when a driver turns the key from the on position to the off position or when the driver presses the button while the engine 102 is running.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle 112.

The throttle actuator module 116 may monitor the position of the throttle 112 using one or more throttle position (TPS) sensors 190. The TPS sensors 190 may provide the throttle position to the throttle actuator module 116, which may provide the throttle position to the ECM 114. Alternatively, the TPS sensors 190 may provide the throttle position directly to the ECM 114. The ambient temperature of air being drawn into the engine 102 may be measured using an intake air temperature (IAT) sensor 192. The ECM 114 may use signals from the sensors to make control decisions for the engine system 100.

Figure 2:
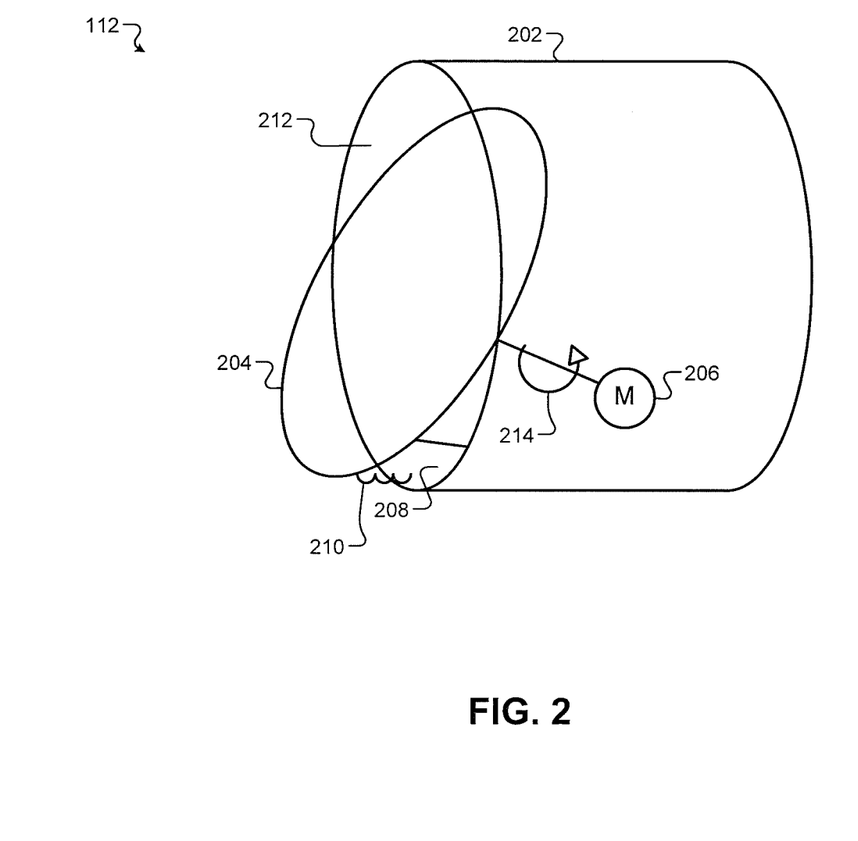
FIG. 2 is a perspective view of a throttle of the engine system of FIG. 1.

Referring to FIG. 2, an example implementation of the throttle 112 includes a cylindrical body 202, a rotatable blade 204, an electric motor 206, a stop 208, and a spring 210. The motor 206 rotates the blade 204 to adjust the throttle 112 between the fully open position and the fully closed position. In the fully open position, the blade 204 may be disposed within a plane that is perpendicular to an opening area 212 of the throttle 112 and may allow airflow through the opening area 212. In the fully closed position, the blade 204 may be disposed within a plane that is parallel to the opening area 212 of the throttle 112, may prevent airflow through the opening area 212, and may be fully seated against the body 202 and/or the stop 208.

The motor 206 rotates the blade 204 in a direction 214 from the fully open position to the fully closed position. The stop 208 may prevent the motor 206 from rotating the blade 204 past the fully closed position. The spring 210 may maintain the throttle 112 at a predetermined opening percentage (e.g., from 7 to 10 percent open) when the spring 210 is in a relaxed state (e.g., when the engine 102 is off and/or when the engine is idling). The motor 206 may compress the spring 210 when the motor 206 rotates the blade 204 into the fully closed position. In the example depicted, the spring 210 is disposed between the blade 204 and the stop 208 such that the spring 210 is compressed between the blade 204 and the stop 208. In other examples, the spring 210 may be disposed at a different location within the throttle 112.

Figure 3:
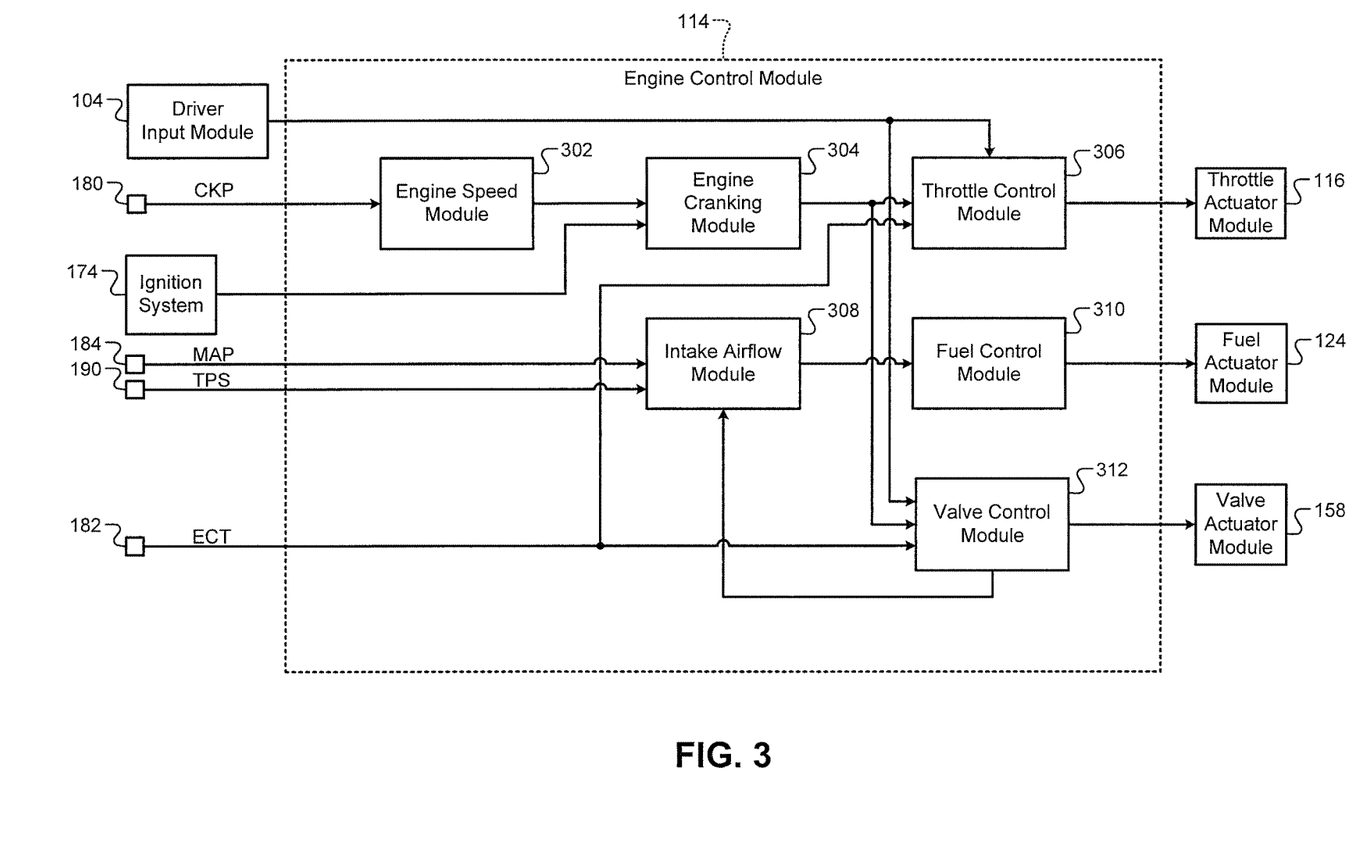
FIG. 3 is a functional block diagram of a control system according to the principles of the present disclosure.

Referring to FIG. 3, an example implementation of the ECM 114 includes an engine speed module 302, an engine cranking module 304, a throttle control module 306, an intake airflow module 308, a fuel control module 310, and a valve control module 312. The engine speed module 302 determines engine speed. The engine speed module 302 may determine the engine speed based on input received from the CKP sensor 180. The engine speed module 302 may determine the engine speed based on an amount of crankshaft rotation between tooth detections and the corresponding period. The engine speed module 302 outputs the engine speed.

The engine cranking module 304 determines whether the engine 102 is cranking and generates a signal indicating whether the engine 102 is cranking. The engine cranking module 304 may determine that the engine 102 starts cranking when the ignition system 174 is switched from off to on (or run). The engine cranking module 304 may determine that the engine 102 transitions from cranking to running when the engine speed is greater than or equal to a predetermined speed (e.g., from 400 revolutions per minute (rpm) to 700 rpm).

The throttle control module 306 sends instructions to the throttle actuator module 116 to adjust the position of the throttle 112. The throttle control module 306 may adjust the throttle 112 to a fully closed position when the engine 102 is cranking. The throttle control module 306 may only adjust the throttle 112 to the fully closed position during engine cranking when the engine coolant temperature from the ECT sensor 182 is less than a predetermined temperature (e.g., 30 degrees Celsius (° C.)).

The valve control module 312 sends instructions to the valve actuator module 158 to adjust the timing, lift, and/or opening duration of the intake valve 122 and/or the exhaust valve 130. The valve control module 312 may limit the opening duration of the intake valve 122 when the engine 102 is cranking. For example, the valve control module 312 may open the intake valve 122 for a first duration when the engine 102 is running and open the intake valve 122 for a second duration that is less than the first duration when the engine 102 is cranking. The valve control module 312 may only limit the opening duration of the intake valve 122 during engine cranking when the engine coolant temperature is less than the predetermined temperature. The valve control module 312 outputs the opening duration of the intake valve 122.

The intake airflow module 308 determines an amount of intake air that enters each cylinder of the engine 102. The intake airflow module 308 may determine the intake air amount based on the manifold pressure from the MAP sensor 184, the throttle position from the TPS sensor 190, the desired throttle position, and/or the opening duration of the intake valve 122. For example, the intake airflow module 308 may determine an amount of intake airflow through the throttle 112 based on the throttle position and the engine vacuum. The intake airflow module 308 may then determine the amount of airflow that enters each cylinder of the engine 102 based on the amount of intake airflow through the throttle 112, the number of cylinders in the engine 102, and/or the opening duration of the intake valve 122.

The fuel control module 310 sends instructions to the fuel actuator module 124 to adjust an amount of fuel provided to each cylinder of the engine 102. The fuel control module 310 may sends instructions to the fuel actuator module 124 to provide fuel to each cylinder at a desired rate. The fuel control module 310 may determine the desired rate at which fuel is provided to a cylinder based on the amount of airflow entering the cylinder. The fuel control module 310 may adjust the desired rate to achieve a desired air/fuel ratio such as a stoichiometric air/fuel ratio.

Figure 4:
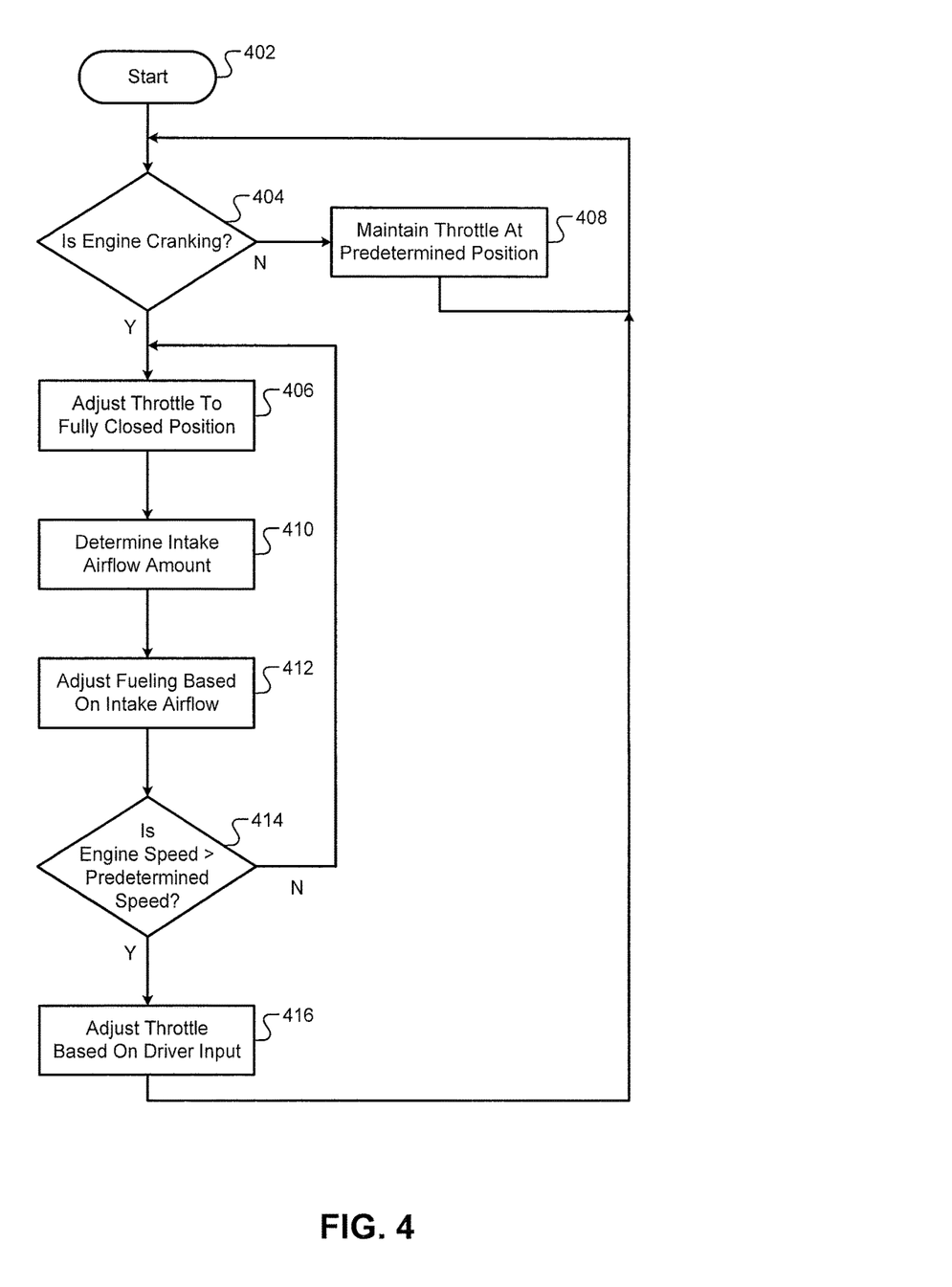
FIG. 4 is a flowchart of a method for limiting a volumetric efficiency of an engine during engine cranking according to the principles of the present disclosure.

Referring now to FIG. 4, a method for limiting a volumetric efficiency of an engine during engine cranking begins at 402. At 404, the method determines whether the engine is cranking. The method may determine that the engine starts cranking when an ignition system of an engine is switched from off to on (or run). The method may determine that the engine transitions from cranking to running when the speed of the engine is greater than or equal to a predetermined speed (e.g., from 400 rpm to 700 rpm). When the engine is cranking, the method continues at 406. Otherwise, the method continues at 408.

At 406, the method adjusts the throttle to a fully closed position (e.g., 0 percent open). In various implementations, in addition to or instead of adjusting the throttle to the fully closed position, the method may decrease an opening duration of an intake valve of one or more (e.g., all) cylinders of the engine when the engine is cranking. For example, the method may open the intake valve for a first duration when the engine is running and open the intake valve for a second duration that is less than the first duration when the engine is cranking.

At 408, the method maintains a throttle of the engine at a predetermined position (e.g., from 7 to 10 percent open). In one example, the throttle includes a rotatable blade, an electric motor, and a spring. The motor may adjust the blade between the predetermined position and a fully open position (e.g., 100 percent open) when the engine 102 is running. The spring may maintain the blade in the predetermined position when the spring is in a relaxed state (e.g., when the engine is off and/or when the engine is idling).

At 410, the method determines an amount of intake air that enters each cylinder of the engine. The method may determine the intake air amount based on a pressure within an intake manifold, a position of a throttle, and/or the opening duration of the intake valve. For example, the method may determine an amount of intake airflow through the throttle based on the throttle position and the engine vacuum. The method may then determine the amount of airflow that enters each cylinder of the engine based on the amount of intake airflow through the throttle, the number of cylinders in the engine, and/or the opening duration of the intake valve.

At 412, the method adjusts an amount of fuel that is provided to each cylinder in the engine based on the amount of intake air that enters each cylinder of the engine. The method may provide fuel to each cylinder at a desired rate. The method may determine the desired rate at which fuel is provided to a cylinder based on the amount of airflow entering the cylinder. The method may adjust the desired rate to achieve a desired air/fuel ratio such as a stoichiometric air/fuel ratio.

At 414, the method determines whether the engine speed is greater than the predetermined speed. If the engine speed is greater than the predetermined speed, the method determines that the engine is running and continues at 416. Otherwise, the method continues at 406. At 416, the method adjusts the throttle based on a driver input (e.g., an accelerator pedal position, a cruise control setting). For example, the method may determine a driver torque request based on the driver input, and adjust the throttle to a position that satisfies the driver torque request when fuel is provided to each cylinder of the engine at a rate that achieves the desired air/fuel ratio.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
   an engine cranking module that:
      determines whether an engine is cranking based on at least one of an input received from an ignition system and engine speed; and
      generates a signal indicating whether the engine is cranking; and
   a throttle control module that selectively adjusts a throttle of the engine to a fully closed position when the signal indicates that the engine is cranking and maintains the throttle in the fully closed position while the engine speed is less than a predetermined speed.

2. The system of claim 1 further comprising a valve control module that opens an intake valve for a first duration when the engine is cranking and opens the intake valve for a second duration when the engine is running, wherein the first duration is less than the second duration.

3. The system of claim 1 wherein the throttle control module adjusts the throttle to the fully closed position while the engine is cranking when an engine coolant temperature is less than a predetermined temperature.

4. The system of claim 1 wherein the engine cranking module determines that the engine starts cranking when the ignition system is switched from off to on.

5. The system of claim 1 wherein the engine cranking module determines that the engine is running when the engine speed is greater than a predetermined speed.

6. The system of claim 1 further comprising an engine speed module that determines the engine speed based on a crankshaft position.

7. The system of claim 1 further comprising an intake airflow module that determines an amount of airflow entering a cylinder of the engine based on a pressure of air within an intake manifold of the engine.

8. The system of claim 7 further comprising a fuel control module that controls a fuel injector to provide fuel to the cylinder at a desired rate.

9. The system of claim 8 wherein the fuel injector injects fuel directly into the cylinder.

10. The system of claim 9 wherein the fuel control module determines the desired rate based on the amount of airflow entering the cylinder and a desired air/fuel ratio.

11. A method comprising:
determining whether an engine is cranking based on at least one of an input received from an ignition system and engine speed;
generating a signal indicating whether the engine is cranking;
selectively adjusting a throttle of the engine to a fully closed position when the signal indicates that the engine is cranking; and
maintaining the throttle in the fully closed position while the engine speed is less than a predetermined speed.

12. The method of claim 11 further comprising:
opening an intake valve for a first duration when the engine is cranking; and
opening the intake valve for a second duration when the engine is running, wherein the first duration is less than the second duration.

13. The method of claim 11 further comprising adjusting the throttle to the fully closed position while the engine is cranking when an engine coolant temperature is less than a predetermined temperature.

14. The method of claim 11 further comprising determining that the engine starts cranking when the ignition system is switched from off to on.

15. The method of claim 11 further comprising determining that the engine is running when the engine speed is greater than a predetermined speed.

16. The method of claim 11 further comprising determining the engine speed based on a crankshaft position.

17. The method of claim 11 further comprising determining an amount of airflow entering a cylinder of the engine based on a pressure of air within an intake manifold of the engine.

18. The method of claim 17 further comprising controlling a fuel injector to provide fuel to the cylinder at a desired rate.

19. The method of claim 18 further comprising injecting fuel directly into the cylinder.

20. The method of claim 19 further comprising determining the desired rate based on the amount of airflow entering the cylinder and a desired air/fuel ratio.

* * * * *